United States Patent [19]

Moriyama et al.

[11] Patent Number: 4,516,191
[45] Date of Patent: May 7, 1985

[54] RETRACTABLE HEAD-LIGHT DEVICE FOR AUTOMOBILES

[75] Inventors: Naomune Moriyama; Fumiyuki Ohtani, both of Hiroshima, Japan

[73] Assignee: Mazda Motor Corporation, Hiroshima, Japan

[21] Appl. No.: 599,342

[22] Filed: Apr. 12, 1984

[30] Foreign Application Priority Data

Apr. 15, 1983 [JP] Japan .................................. 58-67612

[51] Int. Cl.³ .......................................... B60Q 1/06
[52] U.S. Cl. ........................................... 362/65; 49/40; 74/96; 296/1 R; 362/66; 362/285; 362/420; 362/428
[58] Field of Search ....................... 362/61, 64, 65, 66, 362/80, 82, 83, 269, 275, 285, 287, 420, 428; 248/134, 147; 403/57, 74, 157, 158; 74/96, 99 R, 99 A; 49/40, 41; 296/1 R

[56] References Cited

U.S. PATENT DOCUMENTS

| | | | |
|---|---|---|---|
| 3,387,125 | 6/1968 | Ingolia | 362/65 |
| 3,532,870 | 10/1970 | Brueder | 362/65 |
| 3,626,174 | 12/1971 | Cranmore | 362/65 |
| 3,742,205 | 6/1973 | Beauregard et al. | 362/65 |
| 4,139,245 | 2/1979 | McCloskey | 403/157 X |
| 4,243,192 | 1/1981 | Johnson | 403/158 X |
| 4,246,628 | 1/1981 | Ikemizu et al. | 362/65 |
| 4,282,561 | 8/1981 | Yand | 362/65 |
| 4,380,789 | 4/1983 | Craig | 362/65 |
| 4,471,410 | 9/1984 | Nakano | 362/370 X |

FOREIGN PATENT DOCUMENTS 1630909 2/1971 Fed. Rep. of Germany ........ 362/66
2099974 12/1982 United Kingdom .................. 362/66

*Primary Examiner*—David H. Brown
*Attorney, Agent, or Firm*—Fleit, Jacobson, Cohn & Price

[57] ABSTRACT

A retractable automobile head-light device including a retractable head lamp mounted through a linkage for movement between a retracted position and an extended position. A lamp cover panel is mounted at the rear end portion on the automobile body for vertical movements and twisting movements. A lamp cover driving mechanism includes a pair of driving links each connected at one end to the lamp cover panel through a lug and at the other end to the linkage so that the lamp cover is swingably moved together with the movement of the head lamp between the extended and retracted positions. The driving link at the laterally outboard side is larger in length than the inboard link and the lugs for the links have a difference in length complementary to the difference in lengths of the driving links. With this mechanism, the lamp cover panel is twisted when it is mounted from the retracted position to the extended position so as to maintain the front edge substantially horizontally even through there is a downward inclination towards outwards in the body contour.

14 Claims, 8 Drawing Figures

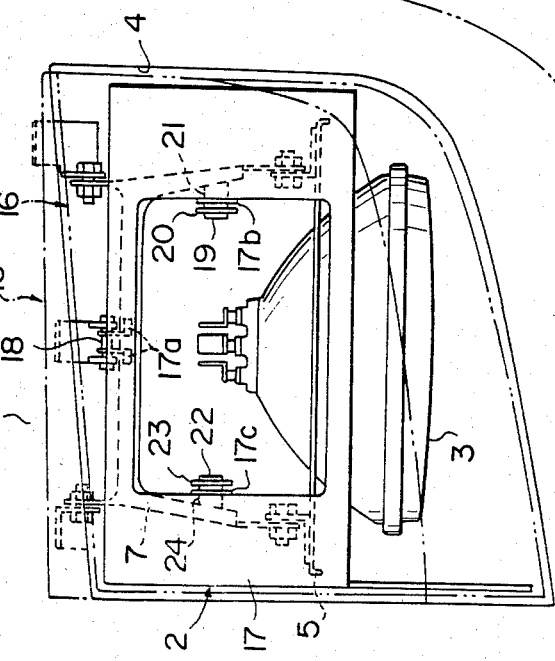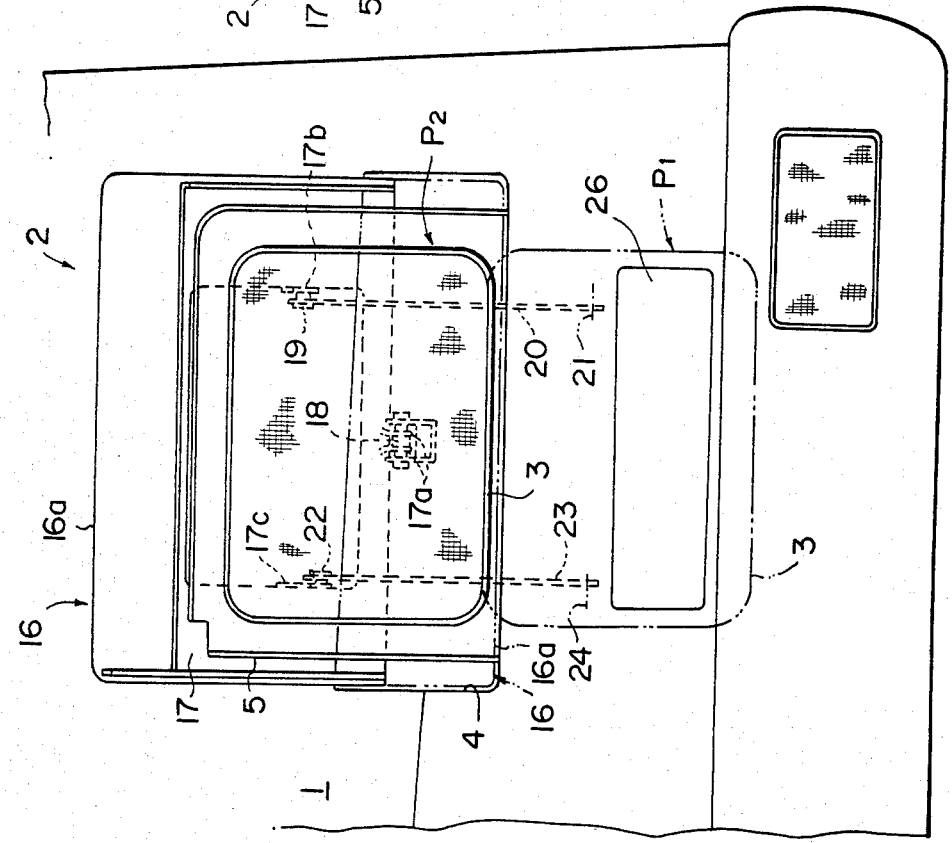

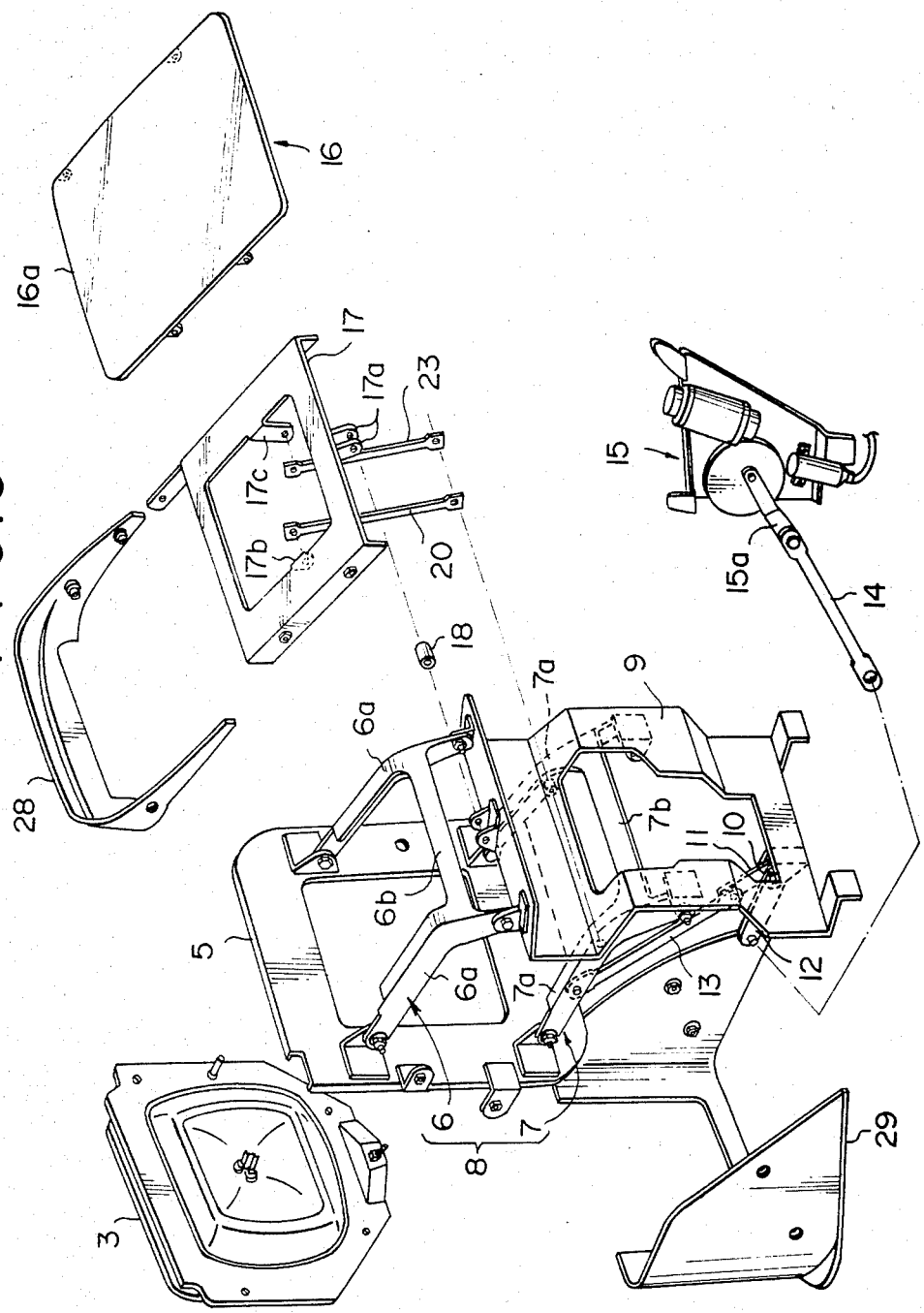

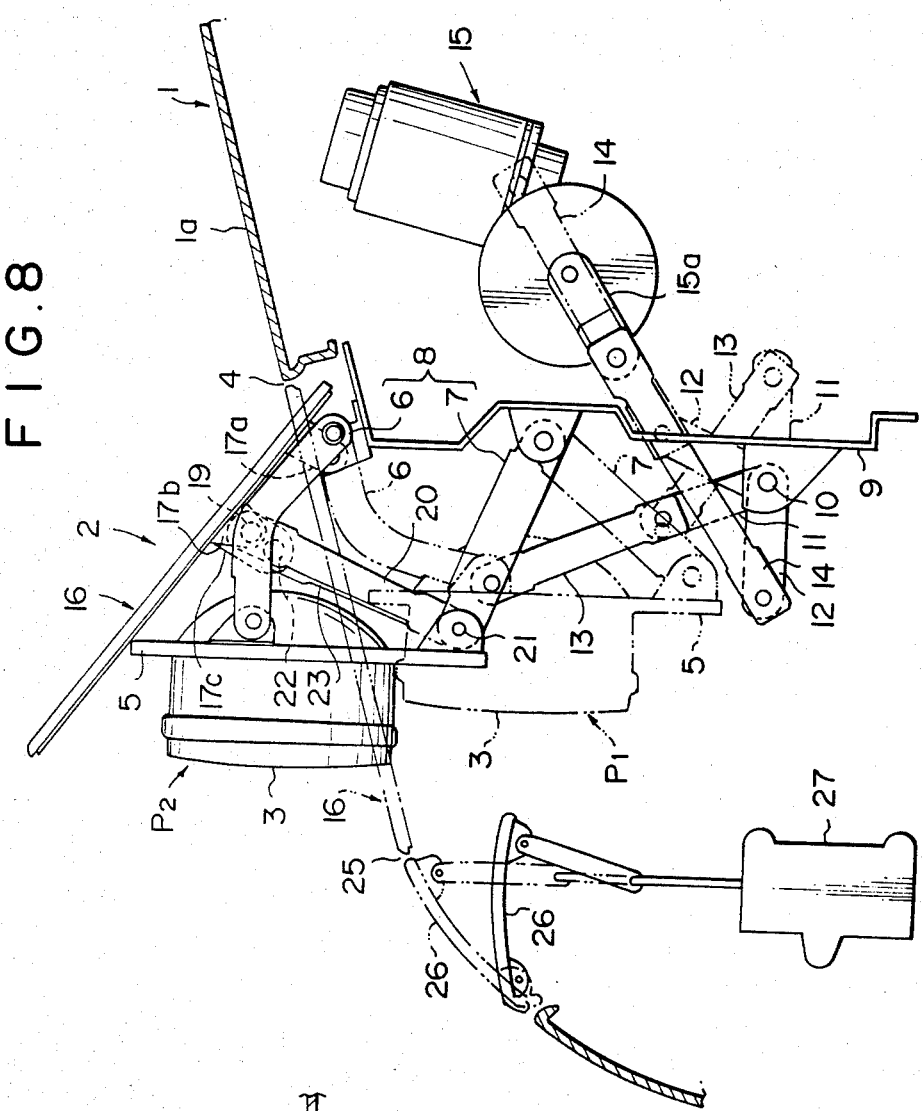
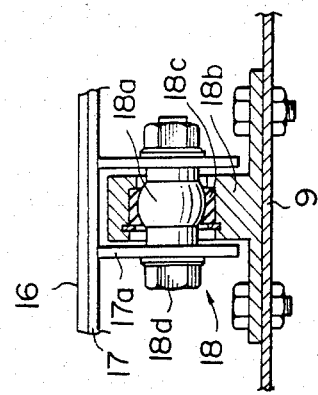

RETRACTABLE HEAD-LIGHT DEVICE FOR AUTOMOBILES

The present invention relates to an automobile head-light device and more particularly to a retractable head-light device.

In automobile industry, in an attempt to make the car body surfaces as flush as possible to thereby improve aeronautical properties, retractable head-light devices have been developed and are going to be widely used. Conventional retractable head-light devices have head lamps mounted on vertically swingable members on car bodies and lamps covers are provided above the head lamps so that they are swung together with the head lamps.

For example, the United Kingdom published patent application No. 2099974 proposes an automobile head-light device wherein the head lamp is supported by a parallel link mechanism so that it can be moved in parallelism between the extended and retracted positions maintaining a forwardly directed orientation. This type of arrangement is advantageous in that in the retracted position, light warning signals can be emitted through for example slits or a transparent plate which may appropriately provided on the body. There is described that the parallel link mechanism is driven by an electric motor through a crank mechanism. The U.K. Patent application further discloses a lamp cover panel provided above the head lamp to provide a flush body surface in the retracted position. In the drawings of the U.K. patent application, it seems that the lamp cover is hinged at the rear end portion to the can body and connected at the forward end portion through a link to the forward end portion of the link mechanism. It should however be pointed out that this driving mechanism can present problems of appearance due a specific contour of the car body in an area where the head-light device is installed.

Describing in more detail, an automobile body has a front portion which is of a three-dimensional configuration wherein both side portions are inclined downwards toward laterally outwards. Further, there are many occasions that the side portions are also inclined downwards toward longitudinally forwards. In an automobile body of such configuration, if the lamp cover is so designed that its front edge is curved substantially in parallel with the front end contour of the body or with the front bumper as seen a top plan view, the front edge of the lamp cover extends substantially horizontally as seen in a front view giving a good appearance. It should however be noted that in this design, the front edge of the lamp cover will be drooped laterally outwards in the extended position of the head-light device. It may be possible to arrange the hinge axis pivotably mounting the lamp cover rear end on the body to extend substantially horizontally. However, this arrangement causes a significant misalignment between the rear edge of the lamp cover and the contour of the body. Therefore, it is desirable to make the hinge axis to extend substantially along the body contour but this arrangement will produce a drooping of the front edge of the lamp cover.

It is therefore an object of the present invention to provide a retractable head-light device in which the head lamp cover can offer good appearance both in the retracted and extended positions.

Another object of the present invention is to provide a retractable head-light device for automobiles in which the front edge of the lamp cover extends substantially horizontally both in the retracted and extended positions giving good appearances.

A further object of the present invention is to provide an automobile retractable head-light device having a head lamp cover driving mechanism which can maintain the front edge of the head lamp cover substantially horizontally irrespective of the three-dimensional contour of the body.

According to the present invention, the above and other objects can be accomplished by a retractable head-light device for automobiles comprising head lamp means mounted on an automobile body for movement between an extended position wherein the head lamp means is projected through opening means in the automobile body and directed substantially forwards and a retracted position wherein the head lamp means is retracted within the body, head lamp cover means having rear end portion mounted on the body for vertical swingable movements between an extended position wherein the lamp cover means uncovers said opening means in the body and a retracted position wherein the lamp cover means closes said opening means to provide a substantially flush body surface, lamp driving means for driving said head lamp means between said extended and retracted positions of the heat lamp means, cover driving means for driving said lamp cover means between said extended and retracted positions in response to movements of the head lamp means, said cover driving means including a pair of cover driving links disposed at the opposite sides of the lamp cover means, each of said cover driving links having one end connected with said lamp cover means and the other end with one of said head lamp means and said lamp driving means so that the lamp cover means is driven together with the head lamp means, said cover driving links having different lengths whereby the lamp cover means is twisted when it is driven from the retracted position to the extended position to thereby maintain front edge of the lamp cover means substantially horizontally.

In a preferable aspect of the present invention, the lamp driving means includes linkage means mounting said head lamp means on the body and motor means for driving the linkage means. The cover driving links may then be connected with the linkage means. The linkage means may include a parallel link mechanism for moving the head lamp means in parallelism between the retracted and extended positions so that the head lamp means is oriented forwards even in the retracted position. In this instance, slit means may be formed in front of the head lamp means in the retracted position so as to allow the warning light signals to pass through. The slit means may be associated with slit cover means for closing the slit. Actuating means may then be provided for actuating the slit cover means to open the slit means whenever warning light switch means is actuated.

The above and other objects and features of the present invention will become apparent from the following description of a preferred embodiment taking reference to the accompanying drawings, in which;

FIG. 2 is a front view showing the left hand head-light device in the extended position;

FIG. 3 is a top plan view of the head-light device with the lamp cover removed to show the details;

FIG. 5 is an exploded perspective view of the headlight device;

FIG. 7 is a sectional view showing details of the pillow ball device for mounting the lamp cover plate; and FIG. 8 is a sectional view similar to FIG. 4 but showing another embodiment.

Figure 1:
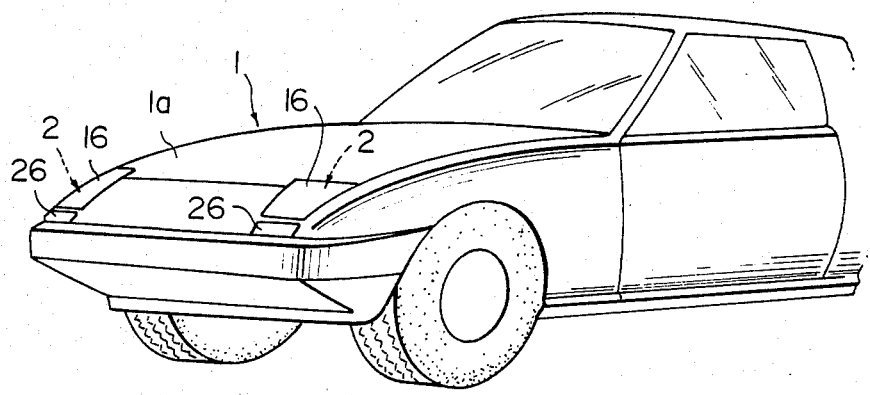
FIG. 1 is a fragmentary perspective view of an automobile having retractable head-light devices.

Referring now to the drawings, particularly to FIG. 1, the automobile shown therein includes a body 1 which includes a front portion 1a having a three-dimensional curvature inclined downwards both longitudinally forwards and laterally outwards. In the front portion, there are provided at the opposite side portions with head-light devices 2. Each of the head-light devices 2 includes a lamp 3 for projecting beams of illuminating light longitudinally forwardly. Attached to the head lamp 3 is a frame bracket 5 which is connected with a parallel linkage 8 including an upper link 6 and a lower link 7. As shown in FIG. 5, the upper link 6 is of a generally H-shaped configuration having a pair of parallel link arms 6a and a connecting leg 6b connecting the intermediate portions of the link arms 6a. The link arms 6a are connected at the front ends to the frame bracket 5 and at the rear ends to a mounting bracket 9 on the body 1. Similarly, the lower link 7 is of a generally H-shaped configuration having a pair of parallel link arms 7a and a connecting leg 7b connecting the link arms 7a together. The link arms 6a are connected at the front ends to the frame basket 5 and at the rear ends to the mounting bracket 9. The link arms 6a and the link arms 7a are parallel with each other. At the portion where the head lamp 3 is located, the body 1 is formed with an opening 4 through which the head lamp 3 is moved between a retracted position $P_1$ shown by phantom lines and an extended or projected position $P_2$ shown by solid lines in FIG. 4. Since the head lamp 3 is mounted through the parallel links 6 and 7, the head lamp 3 can be moved without changing its orientation and maintained at the forwardly directed position both in the retracted and extended positions $P_1$ and $P_2$.

The mounting bracket 9 carries a laterally extending shaft 10 at the lower portion thereof. The shaft 10 has arm members 11 and 12 which are secured thereto. The arm member 11 has a free end connected through a first link 13 with an intermediate portion of one of the link arms 7a in the lower link 7. The arm member 12 has a free end connected through a second link 14 with a rotating arm 15a of an electric driving device 15. With the mechanism described above, it is possible to drive the parallel linkage 8 vertically upwards and downwards to thereby move the head lamp 3 between the retracted and extended positions $P_1$ and $P_2$ attached to the frame bracket 5 are cover members 28 and 29 which encircle the periphery of the head lamp 3.

Above the head lamp 3, there is a lamp cover panel 16 which has a mounting plate 17 secured thereto. The mounting plate 17 is provided at the rear end portion with a bracket 17a through which the mounting plate 17 and the lamp cover panel 16 are hinged to the mounting bracket 9 on the body 1 through a pillow ball device 18 for vertical swinging provements and twisting movements. The pillow ball device 18 includes a pillow ball 18a mounted on the bracket 17a by means of a bolt 18d and a ball receptacle 18c provided on a bracket 18b secured to the bracket 9. The pillow ball 18a is received by the receptacle 18c for rotation so as to permit the aforementioned movements of the lamp cover panel 16. The mounting plate 17 is also formed at an intermediate portion of one side with a lug 17b and at an intermediate portion of the other side with a lug 17c. An outboard lamp cover driving link 20 is connected at the upper end with the lug 17b through a ball joint 19 and at the lower end with one of the link arms 7a of the lower link 7 through a ball joint 21. An inboard lamp cover driving link 23 is connected at the upper end with the lug 17c through a ball joint 22 and at the lower end with the other of the link arms 7a of the lower link 7 through a pin and bush assembly 24. The lower ends of the lamp cover driving links 20 and 23 are substantially at the same level and the lamp cover panel 16 is driven through this mechanism together with the lamp 3. The outboard lamp cover driving link 20 is larger in length than the inboard lamp cover driving link 23 whereas the outboard lug 17b is smaller in length than the inboard lug 17c. The lengths of the links 20 and 23 and the lugs 17b and 17c are determined so that the lamp cover panel 16 is laid substantially flush with the contour of the automobile body 1 in the retracted position. In the retracted position, the links 20 and 23 are substantially parallel with each other. Since the lengths of the outboard lamp cover driving link 20 and the outboard lug 17b have the lengths which have the aforedescribed relationship with the lengths of the inboard lamp cover driving link 23 and the inboard lug 17c, the lamp cover panel 16 is twisted about the pillow ball 18 when it is moved to the extended position so that the leading edge 16a of the lamp cover panel 16 is maintained substantially horizontally.

Figure 4:
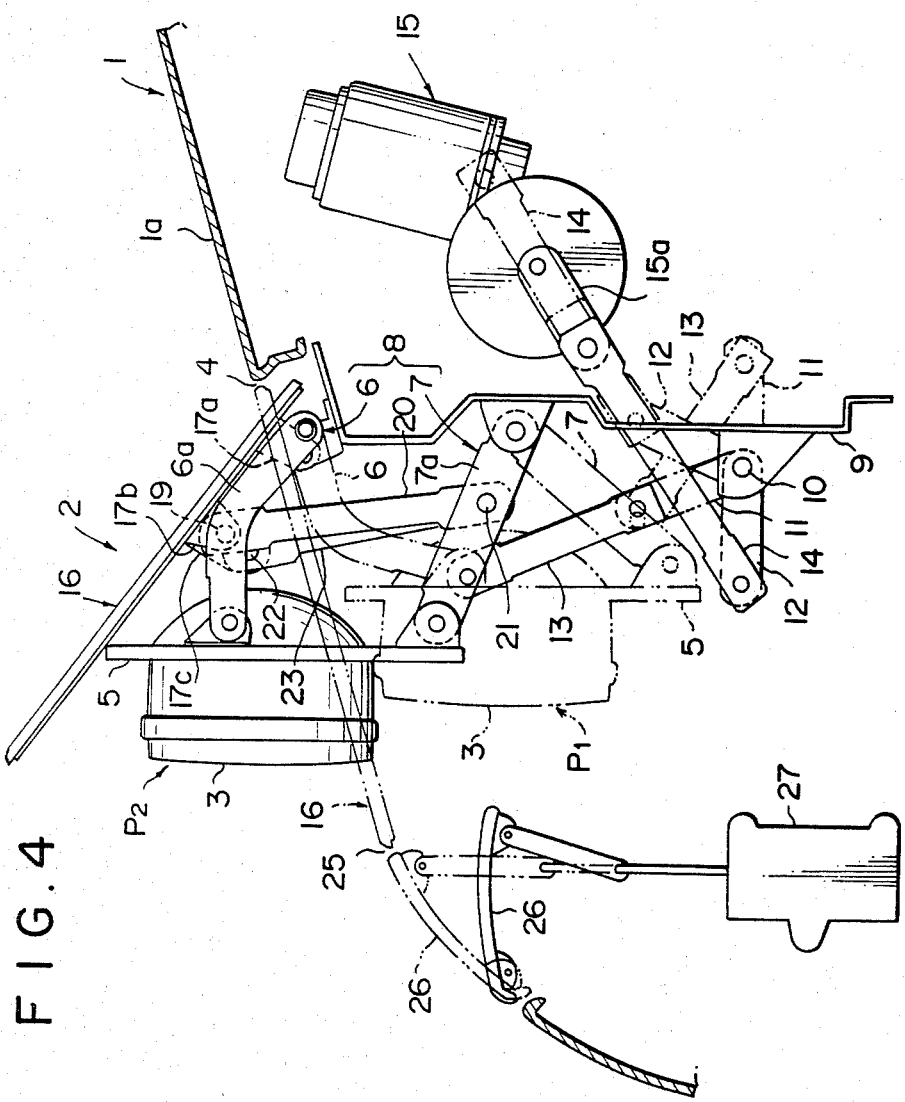
FIG. 4 is a vertical sectional view of the heat-light device.

Referring to FIG. 4, it will be noted that the lamp cover panel 16 is of such a length that a slit 25 is formed in front of the lamp 3 in the retracted position when the cover panel 16 is in the retracted position. A cover or closure panel 26 is provided for closing the slit 25. The closure panel 26 is hinged at the front edge portion so that it is movable between a closed position as shown by phantom lines in FIG. 4 and an open position as shown by solid lines. In order to drive the closure panel 26 between the closed and open positions a solenoid type actuator 27 is provided.

Figure 6:
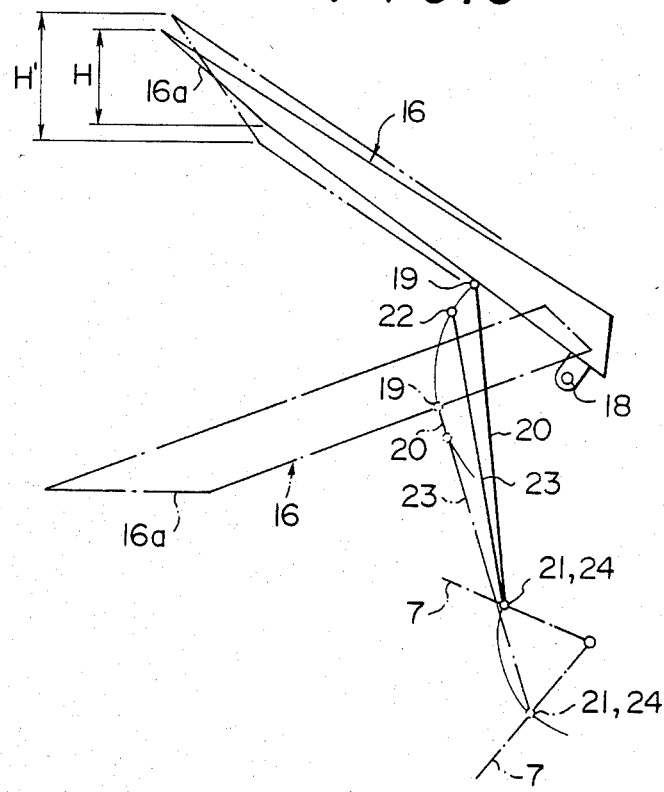
FIG. 6 is a diagrammatical illustration of geometry of movements of the lamp cover.

In the structure described above, when it is desired to project warning light signals with the head lamp 3 in the retracted position and the lamp cover panel 16 in the close position, an actuation of an appropriate switch (not shown) turns the lamp on and at the same time energizes the actuator 27 to move the closure 26 to the open position to thereby open the slit 25. Thus, the light beams from the lamp 3 are projected forwards through the slit 25. For night time illumination, the head lamp 3 is moved to the extended position through an actuation of the driving device 15. At that time, the lamp cover panel 16 is swung upward through the cover driving links 20 and 23. In the course of upward swinging movement of the lamp cover panel 3, the outboard link 20 swingably move by an angular extent which is larger than the angle through which the inboard link 23 swings as shown in FIG. 6 because the lug 17c to which the inboard link 23 is connected is longer than the lug 17b to which the outboard link 20 is connected. This will produce a twisting movement of the lamp cover panel 16. Since the axis of the pillow ball 18 is inclined downwards toward outboard direction so that the leading edge 16a of the lamp cover panel 16 will be inclined by having a difference H' in the level between the inboard and outboard ends of the leading edge 16a if the lamp cover panel 16 is upwardly swung without such twist. However, the aforementioned twist of the lamp cover panel 16 will decrease the difference in the levels of the inboard and outboard ends of the leading edge 16a of the lamp cover panel 16 for example to a value H. Thus, the leading edge 16a presents an appearance that it is maintained substantially horizontally, that is, substantially parallelly with the upper edge of the head lamp in the extended position.

In the structure described above, the slit 25 in front of the head lamp 3 in the retracted position is closed by the closure 26. It should however be noted that the closure 26 may be omitted or substituted by a transparent panel.

FIG. 8 shows another embodiment which is substantially identical to the previous embodiment so that corresponding parts are designated by the same reference numerals as in the previous embodiment. In this embodiment, the lamp cover driving links 20 and 23 are connected at the lower ends not to the link 7 but to the frame bracket 5.

The invention has thus been shown and described with reference to a specific embodiment, however, it should be noted that the invention is in no way limited to the details of the illustrated structures but changes and modifications may be made without departing from the appended claims.

We claim:

1. A retractable head-light device for automobiles comprising head lamp means mounted on an automobile body for movement between an extended position wherein the head lamp means is projected through opening means in the automobile body and directed substantially forwards and a retracted position wherein the head lamp means is retracted within the body, head lamp cover means having a rear end portion mounted on the body for vertical swingable movements between an extended position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, cover driving means for driving said lamp cover means between said extended and retracted positions in response to movements of the head lamp means, said cover driving means including a pair of cover driving links disposed at the opposite sides of the lamp cover means, each of said cover driving links having one end connected with said lamp cover means and the other end with said lamp driving means so that the lamp cover means is driven together with the head lamp means, cover hinge means for pivoting the lamp cover means, said cover hinge means twisting when the lamp cover means is driven from the retracted position to the extended position to thereby maintain a front edge of the lamp cover means substantially horizontally.

2. A retractable head-light device for automobiles comprising head lamp means mounted on an automobile body for movement between an extended position wherein the head lamp means is projected through opening means in the automobile body and directed substantially forwards and a retracted position wherein the head lamp means is retracted within the body, head lamp cover means having a rear end portion mounted on the body for vertical swingable movements between an extended position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, cover driving means for driving said lamp cover means between said extended and retracted positions in response to movements of the head lamp means, said cover driving means including a pair of cover driving links disposed at the opposite sides of the lamp cover means, each of said cover driving links having one end connected with said lamp cover means and the other end with said head lamp means so that the lamp cover means is driven together with the head lamp means, cover hinge means for pivoting the lamp cover means, said cover hinge means twisting when the lamp cover means is driven from the retracted position to the extended position to thereby maintain a front edge of the lamp cover means substantially horizontally.

3. A retractable head-light device for automobiles comprising head lamp means mounted on an automobile body at an area where the body has a contour inclined downwards toward laterally outwards for movement between an extended position wherein the head lamp means is projected through an opening means in the automobile body and directed substantially forwards and a retracted position wherein the head lamp means is retracted within the body, head lamp cover means having a rear end portion mounted on the body for vertical swinging movement between a projected position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, lamp cover driving means including a pair of cover driving links disposed at the opposite sides of the lamp cover means, each of said cover driving links having one end connected with said lamp cover means through lug means and the other end with said lamp driving means so that the lamp cover means is driven together with the head lamp means, said pair of cover driving links being substantially parallel with each other in the retracted position of the head lamp means and having different length, said lug means for the respective links having complementarily different length, cover hinge means for pivoting the lamp cover means, said cover hinge means twisting when the lamp cover means is driven from the retracted position to the extended position to thereby maintain a front edge of the lamp cover means substantially horizontally.

4. A retractable head-light device for automobiles comprising head lamp means mounted on an automobile body at an area where the body has a contour inclined downwards toward laterally outwards for movement between an extended position wherein the head lamp means is projected through an opening means in the automobile body and directed substantially forwards and a retracted position wherein the head lamp means is retracted within the body, head lamp cover means having a rear end portion mounted on the body for vertical swinging movement between a projected position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, lamp cover driving means including a pair of cover driving links disposed at the opposite sides of the lamp cover means, each of said cover driving links having one end connected with said lamp cover means through lug means and the other end with said head lamp means so that the lamp cover means is driven together with the head lamp means, said pair of cover driving links being substantially parallel with each other in the retracted position of the head lamp means and having different length, said lug means for the respective links having complementarily different length, cover hinge means for pivoting the lamp cover means, said cover hinge means twisting when the lamp cover means is driven from the retracted position to the extended position to thereby maintain a front edge of the lamp cover means substantially horizontally.

5. A retractable head-light device for automobiles comprising head lamp means mounted on an automobile body for movement between an extended position wherein the head lamp means is projected through opening means in the automobile body and directed substantially forwards and a retracted position wherein the head lamp means is retracted within the body, head lamp cover means having a rear end portion mounted on the body for vertical swingable movements between an extended position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, cover driving means for driving said lamp cover means between said extended and retracted positions in response to movements of the head lamp means, said cover driving means including a pair of cover driving links disposed at the opposite sides of the lamp cover means, each of said cover driving links having one end connected with said lamp cover means and the other end with said lamp driving means so that the lamp cover means is driven together with the head lamp means, said cover driving links having different lengths, cover hinge means for pivoting the lamp cover means, said cover hinge means twisting when the lamp cover means is driven from the retracted position to the extended position to thereby maintain a front edge of the lamp cover means substantially horizontally.

6. A retractable head-light device in accordance with claim 5 in which said head lamp means is mounted on the automobile body through said lamp driving means which includes a parallel link mechanism so that the head lamp means is maintained at a forwardly directed position both in the retracted and extended positions.

7. A retractable head-light device in accordance with claim 5 in which said head lamp cover means is mounted at an intermediate portion of the rear end portion thereof on the body through said means hinge comprising ball means attached to the lamp cover means and ball receptacle means attached to the body.

8. A retractable head light device in accordance with claim 5 in which said cover driving links includes a laterally outboard link and a laterally inboard link, the outboard link being larger in length than the inboard link, said outboard and inboard links being connected to said lamp cover means through outboard and inboard lugs, respectively, said outboard lug being smaller in length than said inboard lug.

9. A retractable head light device in accordance with claim 8 in which said outboard and inboard links are at substantially the same level with each other at said other ends, said outboard and inboard links being substantially parallel with each other in the retracted position.

10. A retractable head-light device for automobiles comprising head lamp means mounted on an automobile body for movement between an extended position wherein the head lamp means is projected through opening means in the automobile body and directed substantially forwards and a retracted position wherein the head lamp means is retracted within the body, head lamp cover means having a rear end portion mounted on the body for vertical swingable movements between an extended position wherein the lamp cover means uncovers said opening means in the body and a retracted position wherein the lamp cover means closes said opening means to provide a substantially flush body surface, lamp driving means for driving said head lamp means between said extended and retracted positions of the head lamp means, cover driving means for driving said lamp cover means between said extended and retracted positions in response to movements of the head lamp means, said cover driving means including a pair of cover driving links disposed at the opposite sides of the lamp cover means, each of said cover driving links having one end connected with said lamp cover means and the other end with said head lamp means so that the lamp cover means is driven together with the head lamp means, said cover driving links having different lengths, cover hinge means for pivoting the lamp cover means, said cover hinge means twisting when the lamp cover means is driven from the retracted position to the extended position to thereby maintain a front edge of the lamp cover means substantially horizontally.

11. A retractable head-light device in accordance with claim 10 in which said head lamp means is mounted on the automobile body through said lamp driving means which includes a parallel link mechanism so that the head lamp means is maintained at a forwardly directed position both in the retracted and extended positions.

12. A retractable head-light device in accordance with claim 10 in which said head lamp cover means is mounted at an intermediate portion of the rear end portion thereof on the body through said hinge means comprising ball means attached to the lamp cover means and ball receptacle means attached to the body.

13. A retractable head light device in accordance with claim 10 in which said cover driving links includes a laterally outboard link and a laterally inboard link, the outboard link being larger in length than the inboard link, said outboard and inboard links being connected to said lamp cover means through outboard and inboard lugs, respectively, said outboard lug being smaller in length than said inboard lug.

14. A retractable head light device in accordance with claim 13 in which said outboard and inboard links are at substantially the same level with each other at said other ends, said outboard and inboard links being substantially parallel with each other in the retracted position.

* * * * *